US012647860B2

(12) United States Patent
Geng et al.

(10) Patent No.: US 12,647,860 B2
(45) Date of Patent: Jun. 2, 2026

(54) DATA PROCESSING METHOD AND RELATED DEVICE

(71) Applicant: HUAWEI TECHNOLOGIES CO., LTD., Shenzhen (CN)

(72) Inventors: Ruiquan Geng, Shanghai (CN); Rui Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 548 days.

(21) Appl. No.: 18/298,571

(22) Filed: Apr. 11, 2023

(65) Prior Publication Data

US 2023/0254743 A1 Aug. 10, 2023

Related U.S. Application Data

(63) Continuation of application No. PCT/CN2021/115282, filed on Aug. 30, 2021.

(30) Foreign Application Priority Data

Oct. 14, 2020 (CN) .......................... 202011095856.3

(51) Int. Cl.
| | |
|---|---|
| *H04W 36/02* | (2009.01) |
| *H04L 1/1607* | (2023.01) |
| *H04W 28/04* | (2009.01) |
| *H04W 36/30* | (2009.01) |

(52) U.S. Cl.
CPC ....... *H04W 36/0235* (2023.05); *H04L 1/1628* (2013.01); *H04W 28/04* (2013.01); *H04W 36/30* (2013.01)

(58) Field of Classification Search
CPC ..... H04L 1/1628; H04L 1/1841; H04L 47/34; H04W 36/0235; H04W 28/04; H04W 36/30; H04W 36/06; H04W 28/02
See application file for complete search history.

(56) References Cited

U.S. PATENT DOCUMENTS

2002/0110095 A1 8/2002 Jiang et al.

FOREIGN PATENT DOCUMENTS

| | | | |
|---|---|---|---|
| CN | 102970108 A | * | 3/2013 |
| CN | 107920036 A | | 4/2018 |
| JP | 5510482 B2 | | 6/2014 |

OTHER PUBLICATIONS

Partial Supplementary European Search Report issued in corresponding European Application No. 21879133.3, dated Feb. 16, 2024, pp. 1-14.
Canadian Office Action issued in corresponding Canadian Application No. 3,195,649, dated Jun. 11, 2025, pp. 1-5.

* cited by examiner

*Primary Examiner* — Khoa Huynh

(74) *Attorney, Agent, or Firm* — HAUPTMAN HAM, LLP

(57) ABSTRACT

Embodiments of this application provide a data processing method and a related device. In the method, a radio link control RLC entity in a network device receives a first data packet corresponding to a first sequence number SN from a terminal device. The RLC entity determines, based on the first SN and a second SN, whether the first SN jumps abnormally, where the second SN is an SN of any data packet received before a current moment. The RLC layer entity may determine whether the SN jumps abnormally, to perform a subsequent operation such as handover, thereby reducing occurrence of a one-way audio event.

18 Claims, 7 Drawing Sheets

DATA PROCESSING METHOD AND RELATED DEVICE

CROSS-REFERENCE TO RELATED APPLICATIONS

This application is a continuation of International Application No. PCT/CN2021/115282, filed on Aug. 30, 2021, which claims priority to Chinese Patent Application No. 202011095856.3, filed on Oct. 14, 2020. The disclosures of the aforementioned applications are hereby incorporated by reference in their entireties.

TECHNICAL FIELD

This application relates to the communication field, and in particular, to a data processing method and a related device.

BACKGROUND

Voice over LTE (voice over LTE, VoLTE) is an internet protocol (internet protocol, IP) data transmission technology in which all services are carried on a 4G network without a 2G/3G network, and unification of data and voice services on a same network can be implemented. Constructed on the 4G network, VoLTE is an end-to-end voice solution under an all-IP condition. A radio protocol stack of an eNodeB includes the packet data convergence protocol (packet data convergence protocol, PDCP), the radio link control (radio link control, RLC), or the media access control (media access control, MAC). For the voice service, an RLC layer uses a UM mode, that is, a mode in which acknowledgement is not required. In this mode, when finding that a packet is lost, a receiver at the RLC layer does not request a sender to retransmit the packet or feed back a reception status to the sender.

Currently, a receive-side entity at the RLC layer maintains a receive window, and each packet is associated with an SN. The receive-side entity determines, based on whether the SN is continuous, whether a packet is lost. When it is found that the SN is out of order, for example, the receive-side entity at the RLC layer suddenly receives an abnormal packet whose SN is 200 after receiving packets whose SNs are 1, 2, and 3, the receive-side entity starts a timer. It is assumed that packets whose SNs are 4 and 5 are received after the timer is started. In this case, if the timer expires, regardless of whether packets corresponding to SNs of 6 to 199 are all received, the receive window is forcibly slided to 201, and the receive-side entity sequentially parses packets corresponding to SNs of 1, 2, 3, 4, 5, and 200, and delivers the packets to an upper layer (that is, a PDCP layer).

However, because the receive window has reached 201, if the packets corresponding to the SNs of 6 to 199 are subsequently received, the packets cannot be delivered to the PDCP layer. Consequently, intermediate packets are lost, that is, the PDCP layer cannot receive the packets corresponding to the SNs of 6 to 199 in a period of time.

SUMMARY

Embodiments of this application provide a data processing method and a related device, so that an RLC layer entity may determine whether an SN jumps abnormally, to perform a subsequent operation such as handover. This reduces occurrence of a one-way audio event.

A first aspect of embodiments of this application provides a data processing method, where the method includes: a radio link control RLC entity in a network device receives a first data packet corresponding to a first sequence number SN from a terminal device; and the RLC entity determines, based on the first SN and a second SN, whether the first SN jumps abnormally, where the second SN is an SN of any data packet received before a current moment.

In embodiments of this application, the RLC layer entity may determine whether the SN jumps abnormally, to perform a subsequent operation such as handover, thereby reducing occurrence of a one-way audio event.

Optionally, in a possible implementation of the first aspect, the RLC entity determines, based on the first SN and a second SN, whether the first SN jumps abnormally in the foregoing step, including: the RLC entity determines, if a first difference between the first SN and the second SN is greater than a first preset threshold, that the first SN jumps abnormally.

In the possible implementation, when an SN interval between the first SN and an SN of a data packet received last time is excessively long (that is, greater than the first preset threshold), the RLC entity determines that the first SN jumps abnormally. In this way, the RLC entity may sense that the SN jumps abnormally.

Optionally, in a possible implementation of the first aspect, the RLC entity determines, if a first difference between the first SN and the second SN is greater than a first preset threshold in the foregoing step, that the first SN jumps abnormally, including: the RLC entity determines, if the first difference is greater than the first preset threshold, and a second difference between a first moment and the current moment is less than a second preset threshold, that the first SN jumps abnormally, where the first moment is a moment at which a data packet corresponding to the second SN is received before the current moment.

In the possible implementation, when an SN interval between the first SN and an SN of a data packet received last time is excessively long, and a time interval between a first data packet received by the RLC entity and the data packet received last time is less than the second preset threshold, the RLC entity determines that the first SN jumps abnormally. In other words, if a large SN interval occurs in a short time, the RLC entity determines that the SN jumps abnormally. Accuracy of determining, by the RLC entity, that the SN jumps abnormally is improved.

Optionally, in a possible implementation of the first aspect, the RLC entity determines, based on the first SN and the second SN, whether the first SN jumps abnormally in the foregoing step, including: the RLC entity determines, if a third difference between the first SN and a third SN is less than a third preset threshold, and a target variable is greater than 0, that the first SN jumps abnormally, and updates the target variable to 0, where the third SN is an SN corresponding to any data packet received before the current moment other than a temporary buffer, and the target variable is related to an SN of a data packet received before the current moment.

In the possible implementation, when determining whether the SN jumps abnormally, the RLC entity not only compares the SN with the second SN, but also compares the SN with a subsequently received SN, to identify the SN abnormal jump, thereby improving accuracy of determining, by the RLC entity, that the SN jumps abnormally.

Optionally, in a possible implementation of the first aspect, the foregoing step further includes: the RLC entity sends the first data packet to a PDCP entity in the network device if the third difference is less than the third preset threshold and the target variable is 0.

In the possible implementation, when determining whether the SN jumps abnormally, the RLC entity not only compares the SN with the second SN, but also compares the SN with a subsequently received SN, to identify the SN abnormal jump, thereby improving accuracy of determining, by the RLC entity, that the SN jumps abnormally.

Optionally, in a possible implementation of the first aspect, the foregoing step further includes: the RLC entity temporarily buffers the first data packet if the third difference is greater than the third preset threshold, and increases the target variable by 1, where the third SN is the SN corresponding to any data packet received before the current moment other than the temporary buffer, and the target variable is related to the SN of the data packet received before the current moment.

In the possible implementation, when determining whether the SN jumps abnormally, the RLC entity not only compares the SN with the second SN, but also compares the SN with a subsequently received SN, to identify the SN abnormal jump, thereby improving accuracy of determining, by the RLC entity, that the SN jumps abnormally.

Optionally, in a possible implementation of the first aspect, in the foregoing step, the second SN is a largest SN in data packets received before the current moment.

In the possible implementation, accuracy of determining, by the RLC entity, that the SN jumps abnormally may be improved by comparing the SN with a previous largest SN.

Optionally, in a possible implementation of the first aspect, in the foregoing step, the third SN is a largest SN in the data packet received before the current moment other than the temporary buffer.

In the possible implementation, accuracy of determining, by the RLC entity, that the SN jumps abnormally may be improved by comparing the SN with a previous largest SN other than the temporary buffer.

Optionally, in a possible implementation of the first aspect, after the RLC entity determines that the first SN jumps abnormally in the foregoing step, the method further includes: the RLC entity sends first abnormality information to the packet data convergence protocol PDCP entity in the network device, so that the PDCP entity indicates an RRC entity to perform intra-cell handover of the terminal device, where the first abnormality information indicates that the SN jumps abnormally.

In the possible implementation, after determining that the SN jumps abnormally, the RLC entity may send the abnormality information to the PDCP entity, so that the PDCP entity may determine, in time, whether SN abnormality information is associated with the one-way audio event, to trigger intra-cell handover of the terminal device in time.

Optionally, in a possible implementation of the first aspect, after the RLC entity determines that the first SN jumps abnormally in the foregoing step, the method further includes: the RLC entity sends second abnormality information to a radio resource control RRC entity in the network device, where the second abnormality information indicates the RRC entity to perform intra-cell handover of the terminal device.

In the possible implementation, after determining that the SN jumps abnormally, the RLC entity may directly send the abnormality information to the RRC entity, so that the RRC entity may trigger the intra-cell handover of the terminal device in time.

A second aspect of embodiments of this application provides a data processing method, including: a PDCP entity receives first abnormality information sent by an RLC entity, where the first abnormality information indicates that an SN jumps abnormally; and the PDCP entity in the network device determines that a one-way audio event is caused by the SN abnormal jump if a fourth difference between a current moment and a corresponding previous moment at which a data packet sent by the RLC entity in the network device is received is greater than a fourth preset threshold, and a fifth difference between the current moment and a corresponding previous moment at which an SN abnormal jump sent by the RLC entity is received is less than a fifth preset threshold.

In embodiments of this application, the PDCP entity may associate the SN abnormal jump with the one-way audio event, so that the intra-cell handover of the terminal device may be subsequently triggered in time, and the one-way audio event or a voice service is quickly recovered.

Optionally, in a possible implementation of the second aspect, the step further includes: the PDCP entity sends third abnormality information to an RRC entity, where the third abnormality information indicates the RRC entity to trigger a terminal device to perform intra-cell handover, and the data packet is a data packet of the terminal device that is forwarded by the RLC entity to the PDCP entity.

In the possible implementation, after associating the SN abnormal jump with the one-way audio event, the PDCP entity may send the abnormality information to the RRC entity, so that the RRC entity may trigger the intra-cell handover of the terminal device in time.

A third aspect of this application provides a communication apparatus. The communication apparatus may be an RLC entity. Alternatively, the communication apparatus may be a component (for example, a processor, a chip, or a chip system) of an RLC entity, and the communication apparatus includes:

a receiving unit, configured to receive a first data packet corresponding to a first sequence number SN from a terminal device; and a processing unit, configured to determine, based on the first SN and a second SN, whether the first SN jumps abnormally, where the second SN is an SN of any data packet received before a current moment.

Optionally, in a possible implementation of the third aspect, the processing unit is specifically configured to determine, if a first difference between the first SN and the second SN is greater than a first preset threshold, that the first SN jumps abnormally.

Optionally, in a possible implementation of the third aspect, the processing unit is specifically configured to determine, if the first difference is greater than the first preset threshold, and a second difference between a first moment and the current moment is less than a second preset threshold, that the first SN jumps abnormally, where the first moment is a moment at which a data packet corresponding to the second SN is received before the current moment.

Optionally, in a possible implementation of the third aspect, the processing unit is specifically configured to: determine, if a third difference between the first SN and a third SN is less than a third preset threshold, and a target variable is greater than 0, that the first SN jumps abnormally, and update the target variable to 0, where the third SN is an SN corresponding to any data packet received before the current moment other than a temporary buffer, and the target variable is related to an SN of a data packet received before the current moment.

Optionally, in a possible implementation of the third aspect, the RLC entity further includes:

a first sending unit, configured to send the first data packet to a PDCP entity in the network device if the third difference is less than the third preset threshold and the target variable is 0.

Optionally, in a possible implementation of the third aspect, the processing unit is further configured to: temporarily buffer the first data packet if the third difference is greater than the third preset threshold, and increase the target variable by 1, where the third SN is the SN corresponding to any data packet received before the current moment other than the temporary buffer, and the target variable is related to the SN of the data packet received before the current moment.

Optionally, in a possible implementation of the third aspect, the second SN is a largest SN in data packets received before the current moment.

Optionally, in a possible implementation of the third aspect, the third SN is a largest SN in the data packet received before the current moment other than the temporary buffer.

Optionally, in a possible implementation of the third aspect, the RLC entity further includes:

a second sending unit, configured to send first abnormality information to the PDCP entity in the network device, so that the PDCP entity indicates an RRC entity to perform intra-cell handover of the terminal device, where the first abnormality information indicates that the SN jumps abnormally.

Optionally, in a possible implementation of the third aspect, the RLC entity further includes:

a third sending unit, configured to send second abnormality information to an RRC entity in the network device, where the second abnormality information indicates the RRC entity to perform intra-cell handover of the terminal device.

A fourth aspect of this application provides a communication apparatus. The communication apparatus may be a PDCP entity. Alternatively, the communication apparatus may be a component (for example, a processor, a chip, or a chip system) of a PDCP entity, and the communication apparatus includes:

a receiving unit, configured to receive first abnormality information sent by an RLC entity, where the first abnormality information indicates that an SN jumps abnormally; and a processing unit, configured to determine, if a fourth difference between a current moment and a corresponding previous moment at which a data packet sent by the RLC entity in the network device is received is greater than a fourth preset threshold, and a fifth difference between the current moment and a corresponding previous moment at which an SN abnormal jump sent by the RLC entity is received is less than a fifth preset threshold, that a one-way audio event is caused by the SN abnormal jump.

Optionally, in a possible implementation of the fourth aspect, the PDCP entity further includes:

a sending unit, configured to send third abnormality information to an RRC entity, where the third abnormality information indicates the RRC entity to trigger a terminal device to perform intra-cell handover, and the data packet is a data packet of the terminal device that is forwarded by the RLC entity to the PDCP entity.

A fifth aspect of embodiments of this application provides a communication apparatus. The communication apparatus may be an RLC entity, or may be a component (for example, a processor, a chip, or a chip system) of an RLC entity. The communication apparatus performs the method according to the first aspect or any possible implementation of the first aspect.

A sixth aspect of embodiments of this application provides a communication apparatus. The communication apparatus may be a PDCP entity, or may be a component (for example, a processor, a chip, or a chip system) of a PDCP entity. The communication apparatus performs the method according to the second aspect or any possible implementation of the second aspect.

A seventh aspect of embodiments of this application provides a computer-readable storage medium. The computer-readable storage medium stores instructions, and when the instructions are executed on a computer, the computer is enabled to perform the method according to the first aspect or any possible implementation of the first aspect, or the method according to the second aspect or any possible implementation of the second aspect.

An eighth aspect of embodiments of this application provides a computer program product. When the computer program product is executed on a computer, the computer is enabled to perform the method according to the first aspect or any possible implementation of the first aspect, or the method according to the second aspect or any possible implementation of the second aspect.

A ninth aspect of embodiments of this application provides a communication apparatus, including a processor. The processor is coupled to a memory, the memory is configured to store a program or instructions, and when the program or instructions is/are executed by the processor, the apparatus is enabled to implement the method according to the first aspect or any possible implementation of the first aspect.

A tenth aspect of embodiments of this application provides a communication apparatus, including a processor. The processor is coupled to a memory, the memory is configured to store a program or instructions, and when the program or instructions is/are executed by the processor, the apparatus is enabled to implement the method according to the second aspect or any possible implementation of the second aspect.

An eleventh aspect of embodiments of this application provides a communication system, including the communication apparatus according to the third aspect, the fifth aspect, or the ninth aspect, and the communication apparatus according to the fourth aspect, the sixth aspect, or the tenth aspect.

A twelfth aspect of embodiments of this application provides a chip. The chip includes a processor and a communication interface. The communication interface is coupled to the processor, and the processor is configured to run a computer program or instructions, so that the method according to the first aspect or any possible implementation of the first aspect, or the method according to the second aspect or any possible implementation of the second aspect is performed.

For technical effects brought by the third aspect, the fifth aspect, the seventh aspect, the eighth aspect, the ninth aspect, the eleventh aspect, the twelfth aspect, or any possible implementation, refer to technical effects brought by the first aspect or different possible implementations of the first aspect. Details are not described herein.

For technical effects brought by the fourth aspect, the sixth aspect, the seventh aspect, the eighth aspect, the tenth aspect, the eleventh aspect, the twelfth aspect, or any possible implementation, refer to technical effects brought by the second aspect or different possible implementations of the second aspect. Details are not described herein.

It may be learned from the foregoing technical solutions that embodiments of this application have the following advantages: The radio link control RLC entity in the network device receives the first data packet corresponding to the first sequence number SN from the terminal device. The RLC entity determines, based on the first SN and the second SN, whether the first SN jumps abnormally, where the second SN is the SN of any data packet received before the current moment. The RLC layer entity may determine whether the SN jumps abnormally, to perform a subsequent operation such as handover, thereby reducing occurrence of a one-way audio event.

DESCRIPTION OF EMBODIMENTS

Embodiments of this application provide a data processing method and a related device. An RLC layer entity may determine whether an SN jumps abnormally, to perform a subsequent operation such as handover, thereby reducing occurrence of a one-way audio event.

The following clearly and completely describes the technical solutions in embodiments of this application with reference to the accompanying drawings in embodiments of this application. It is clear that the described embodiments are merely some but not all of embodiments of this application.

This application may be applied to protocol frameworks of a plurality of wireless communication systems. The wireless communication system may include but is not limited to a long term evolution (long term evolution, LTE) system, a new radio (New Radio, NR) system, a future evolved communication system, or the like. The future evolved communication system is, for example, a future network or a sixth generation communication system.

Figure 1:
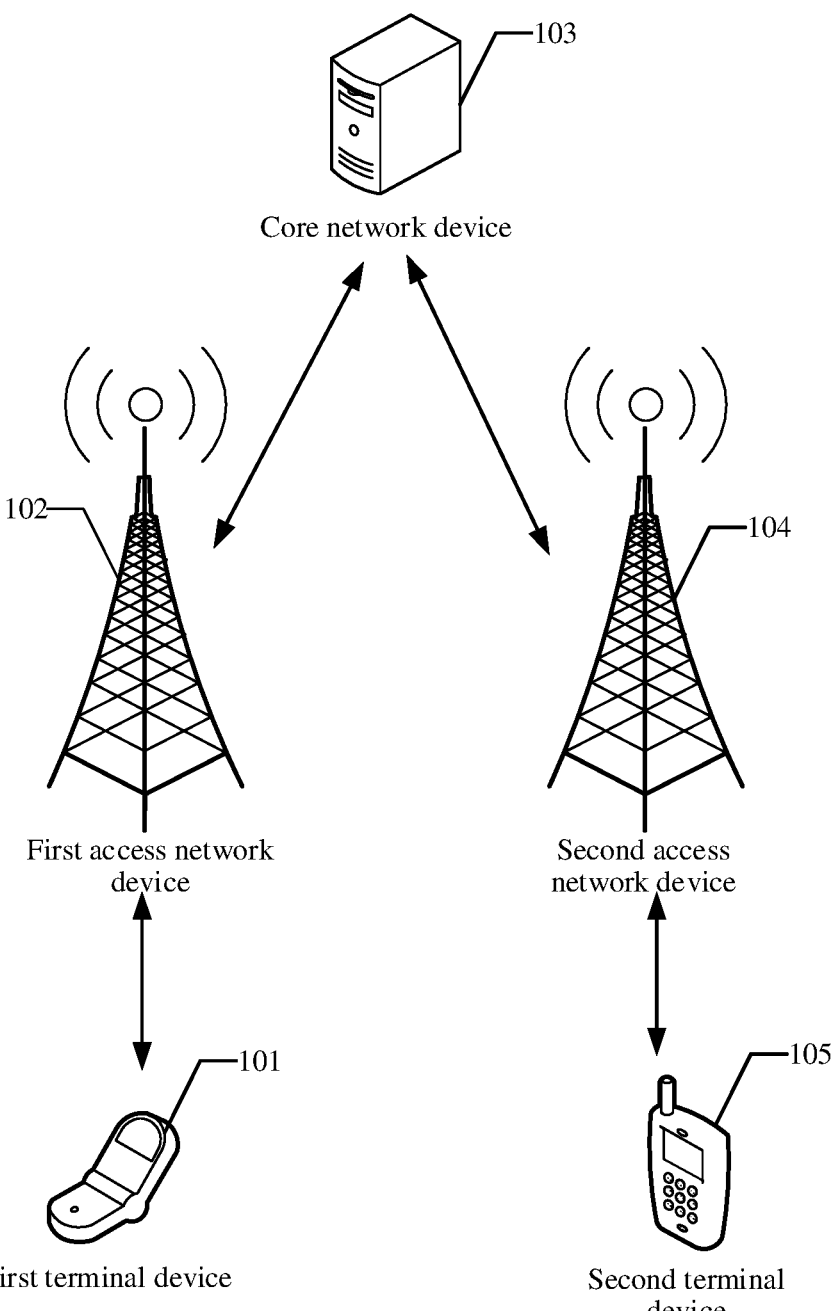
FIG. 1 is a schematic diagram of a communication system according to an embodiment of this application.

FIG. 1 is a schematic diagram of a communication system. The communication system may include a first terminal device 101, a first access network device 102, a core network device 103, a second access network device 104, and a second terminal device 105.

The first terminal device 101 communicates with the second terminal device 105 through the first access network device 102, the core network device 103, and the second access network device 104.

It may be understood that FIG. 1 merely shows an example of communication between the first terminal device 101 and the second terminal device 105. The first terminal device 101 and the second terminal device 105 may alternatively be connected to a same access network device. This is not specifically limited herein.

In embodiments of this application, only one core network device, two access network devices, and two terminal devices are used as examples for description. In actual application, there may be more core network devices, access network devices, or terminal devices in the communication system in embodiments of this application. A quantity of core network devices, a quantity of access network devices, and a quantity of terminal devices are not limited in embodiments of this application.

Figure 2:
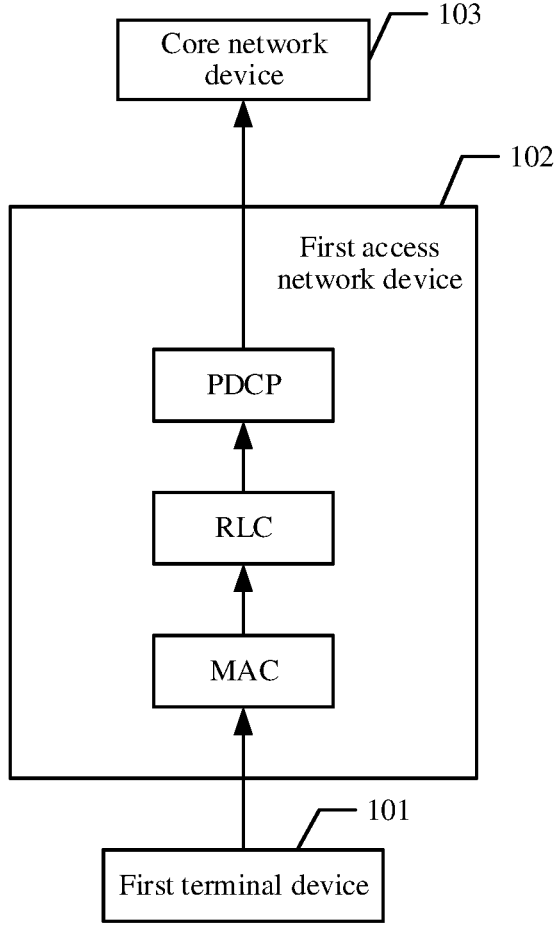
FIG. 2 is a schematic diagram of an internal logical structure of an access network device according to an embodiment of this application.

FIG. 2 shows an example of an internal logical structure of the access network device 102. The access network device 102 may logically include a MAC layer, an RLC layer, and a PDCP layer. The access network device 102 may further include an RRC layer. An entity corresponding to the RLC layer is referred to as an RLC entity, an entity corresponding to a PDCP layer is referred to as a PDCP entity, and an entity corresponding to an RRC layer is referred to as an RRC entity. A flow direction of transmitting uplink data between the first terminal device 101 and the access network device 103 is shown by an arrow in FIG. 2, and a flow direction of transmitting downlink data between the first terminal device 101 and the access network device 103 is opposite to the arrow in FIG. 2. Details are not described herein.

An operation of each layer in the access network device 102 in an uplink data transmission process is as follows: The MAC layer demultiplexes a data packet and sends the data packet to the RLC layer. The RLC layer removes an RLC protocol header, and sends the data packet to the PDCP layer. The PDCP layer removes a PDCP header, and sends the data packet to the core network device. Operations of layers inside the access network device 102 in a downlink data transmission process are opposite to the foregoing operations, and details are not described herein.

In actual application, the MAC layer, the RLC layer, the PDCP layer, or the radio resource control (radio resource control, RRC) layer in the access network device may be on a same circuit board, or may be on different circuit boards. Generally, for a small base station in 4G and 5G, the MAC layer, the RLC layer, the PDCP layer, or the RRC layer is on a same circuit board.

The access network device (the first access network device and/or the second access network device) in embodiments of this application may be any device with a wireless transceiver function. The device includes but is not limited to: a base transceiver station (base transceiver station, BTS) in a base station (for example, a universal mobile telecommunications system (Universal Mobile Telecommunications System, UMTS) system), an evolved NodeB (evolved NodeB, eNB) in a long term evolution (Long Term Evolution, LTE) system, a base station in a fifth generation communication system, a base station in a future communication system, or the like, a remote radio unit (remote radio unit, RRU), a radio relay node, a radio backhaul node, a transmission reception point (transmission reception point, TRP), and a radio controller in a cloud radio access network (cloud radio access network, CRAN) scenario, and the device may further be another communication system such as an access point (Access Point, AP) of wireless fidelity (Wireless Fidelity, Wi-Fi). This is not specifically limited herein.

A terminal device (a first terminal device and/or a second terminal device) in embodiments of this application may be a device that provides a user with voice and/or data connectivity, a handheld device with a wireless connection function, or another processing device connected to a wireless modem. The terminal device may be deployed on land, including being deployed indoor, outdoor, handheld, wearable, or in-vehicle; or may be deployed on a water surface (for example, on a ship); or may be deployed in the air (for example, on an airplane, a balloon, or a satellite). The terminal device may be a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a vehicle-mounted terminal device, a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), a wearable terminal device, or the like. An application scenario is not limited in embodiments of this application. The terminal device sometimes may also be referred to as a terminal, user equipment (user equipment, UE), an access terminal device, a vehicle-mounted terminal, an industrial control terminal, a UE unit, a UE station, a mobile station, a mobile console, a remote station, a remote terminal device, a mobile device, a UE agent, a UE apparatus, or the like. The terminal device may be fixed or mobile.

The core network device may correspond to different devices in different systems. For example, in 3G, the core network device may correspond to a serving GPRS support node (serving GPRS support node, SGSN) of a general packet radio service (general packet radio service, GPRS) and/or a gateway GPRS support node (gateway GPRS Support Node, GGSN); in 4G, the core network device may correspond to a mobility management entity (mobility management entity, MME) and/or a serving gateway (serving gateway, S-GW); and in 5G, the core network device may correspond to an access and mobility management function (Access and Mobility Management Function, AMF) entity, a session management function (Session Management Function, SMF) entity, or a user plane function (User plane Function, UPF) entity.

In embodiments of this application, only an example in which the network device is a base station and the terminal device is UE is used for description.

The VoLTE is an IP data transmission technology in which all services are carried on a 4G network without a 2G/3G network, so that data and a voice service may be unified in a same network. Constructed on the 4G network, the VoLTE is an end-to-end voice solution under an all-IP condition. A radio protocol stack of an eNodeB includes PDCP, RLC, and MAC. For the voice service, an RLC layer uses a UM mode, that is, a mode in which acknowledgment is not required. In the mode, when finding packet loss, a receiver at the RLC layer does not request a sender to retransmit a packet or feed back a reception status to the sender.

Currently, a receive-side entity at the RLC layer maintains a receive window, and each packet is associated with an SN. The receive-side entity determines whether the packet loss occurs according to whether the SN is continuous. When it is found that the SN is out of order, for example, after receiving a packet whose SN is 1, 2, and 3, the receive-side entity at the RLC layer suddenly receives an abnormal packet whose SN is 200, and the receive-side entity starts a timer. It is assumed that a packet whose SN is 4 and 5 is received after the timer is started. If the timer expires, regardless of whether packets corresponding to SNs ranging from 6 to 199 are received, the receive window is forcibly slided to 201, and the receive-side entity sequentially parses packets corresponding to SNs ranging from 1, 2, 3, 4, 5, and 200, and delivers the packets to an upper layer (that is, a PDCP layer).

However, because the receive window has reached 201, if the packets corresponding to the SNs ranging from 6 to 199 are subsequently received, the packets cannot be delivered to the PDCP layer. As a result, intermediate packets are lost, that is, the PDCP layer cannot receive the packets corresponding to the SNs ranging from 6 to 199 in a period of time. A one-way audio event occurs. As a result, a user cannot hear voices or send voices in a period of time, affecting user experience.

When the core network processes the one-way audio event, a timer is usually used for protection. If a voice service is detected to have no data packet in a direction for a period of time, the core network initiates a release procedure to release the voice service, that is, a call drop is generated. The timer is configurable, and duration of 10 s is generally set on the timer, which is longest one-way audio duration that the user can tolerate according to research of a carrier.

However, when the timer expires, the core network releases the voice service simply and roughly, and the user needs to dial again to start a call process, which cannot improve user experience.

A root cause for the foregoing scenario in which one-way audio occurs because abnormality occurs at the RLC layer is an SN error of an RLC packet. An RLC protocol does not provide special protection measures for an SN in a packet header. Therefore, a completely incorrect packet may not be identified or discarded and is used as a correct RLC packet. If the SN jumps abnormally, a receive window at the RLC layer is prone to be disturbed, causing one-way audio.

For the foregoing problem, embodiments of this application provide a data processing method. The following describes a data processing method in embodiments of this application.

Figure 3:
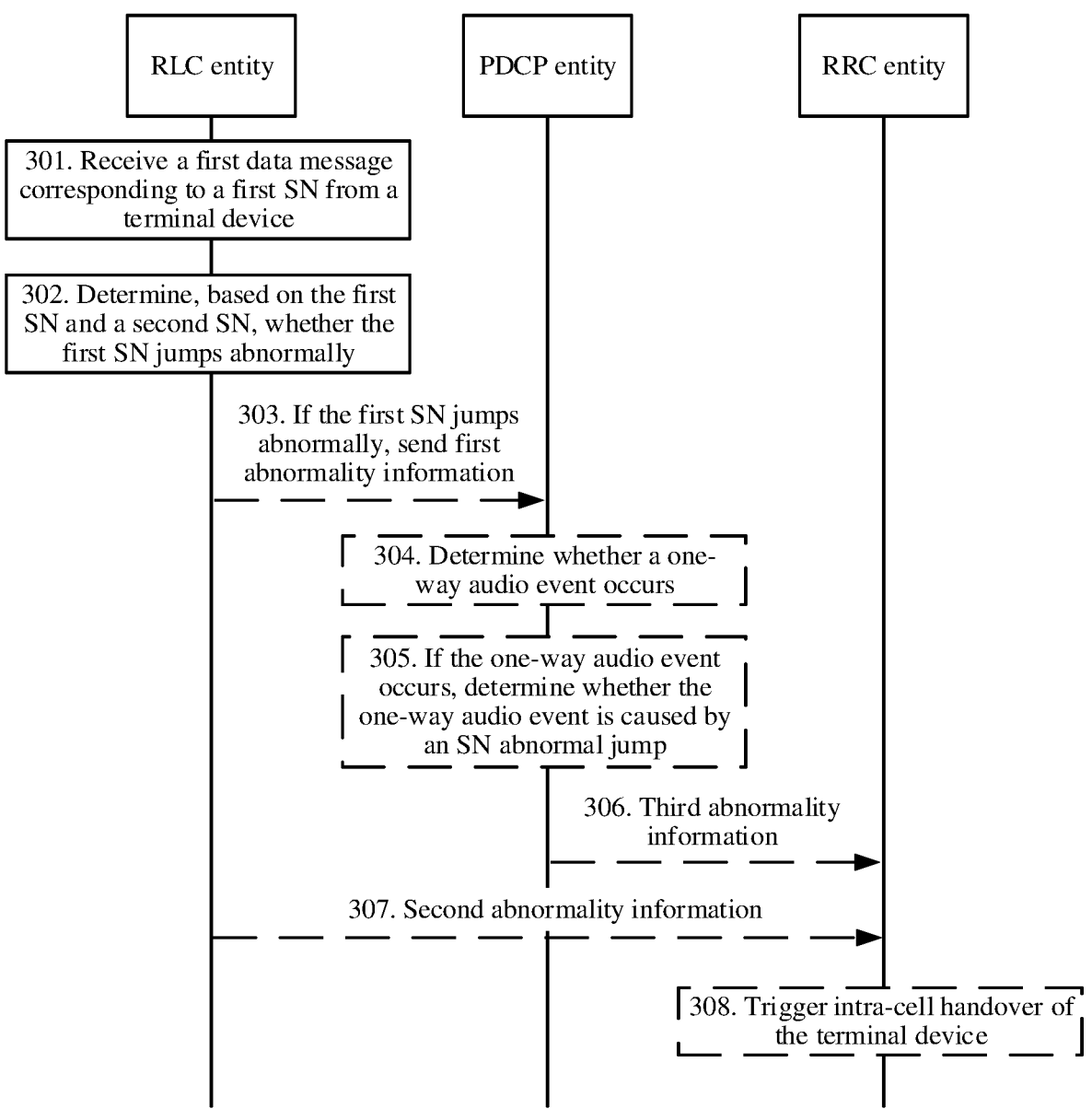
FIG. 3 is a schematic flowchart of a data processing method according to an embodiment of this application.

Refer to FIG. 3. An embodiment of a data processing method in embodiments of this application includes the following steps.

301. An RLC entity receives a first data packet corresponding to a first SN from a terminal device.

Optionally, the terminal device sends the first data packet to the network device through an air interface. After receiving the first data packet, a MAC entity in the network device demultiplexes the first data packet, and sends the demultiplexed first data packet to the RLC entity.

Optionally, when the first data packet corresponds to a plurality of RLC entities, after being demultiplexed, the MAC entity separately sends the demultiplexed data packet to different RLC entities.

The terminal device in embodiments of this application may be the first terminal device in FIG. 1, and the network device may be the first access network device in FIG. 1. Alternatively, the terminal device may be the second terminal device in FIG. 1, and the network device may be the second access network device in FIG. 1.

302. The RLC entity determines, based on the first SN and a second SN, whether the first SN jumps abnormally.

In embodiments of this application, there are many manners in which the RLC entity determines, based on the first SN and the second SN, whether the first SN jumps abnormally. Descriptions are respectively made below.

1. If a first difference between the first SN and the second SN is greater than a first preset threshold, the RLC entity determines that the first SN jumps abnormally.

The second SN in embodiments of this application is an SN of any data packet received before the current moment. Further, the second SN may be a largest SN in data packets received by the RLC entity before the current moment.

In this embodiment, only an example in which the current moment is a corresponding previous moment at which the RLC entity receives the first data packet is used for description. It may be understood that the current moment may also be a moment of a local system clock when the RLC entity determines whether an abnormal jump occurs, which is not specifically limited herein.

If a first difference between the first SN and the second SN is greater than a first preset threshold, the RLC entity determines that the first SN jumps abnormally. If a first difference between the first SN and the second SN is less than a first preset threshold, the RLC entity determines that the first SN does not jump abnormally.

In other words, when an SN interval between the first SN and an SN of a data packet received last time is excessively long (that is, greater than the first preset threshold), the RLC entity determines that the first SN jumps abnormally.

In embodiments of this application, the first preset threshold may be ThrdSnIntv, and is defined as an SN interval threshold. If the ThrdSnIntv is exceeded, it represents that an abnormal jump may occur.

In embodiments of this application, the first SN may be CurSn, that is, an SN of a data packet received this time. The second SN may be Vur(H), that is, a currently largest SN received at a receive side of the RLC.

The step may be understood as follows: If CurSn—Vur (H)>ThrdSnIntv, the RLC entity determines that the data packet received this time jumps abnormally, or the SN received this time jumps abnormally. If CurSn—Vur (H)<ThrdSnIntv, the RLC entity determines that the data packet received this time does not jump abnormally, or the SN received this time does not jump abnormally.

2. If a first difference between the first SN and the second SN is greater than a first preset threshold, and a second difference between the first moment and the current moment is less than a second preset threshold, the RLC entity determines that the first SN jumps abnormally.

In embodiments of this application, the first moment is a moment at which the data packet corresponding to the second SN is received before the current moment. Further, corresponding to the second SN, the first moment may be a moment at which a data packet corresponding to a largest SN is received before the current moment.

If a first difference between the first SN and the second SN is greater than a first preset threshold, and a second difference between the first moment and the current moment is less than a second preset threshold, the RLC entity determines that the first SN jumps abnormally. In other words, if either of the two conditions is not met, the RLC entity determines that the first SN is not abnormal.

In other words, when an SN interval between the first SN and an SN of a data packet received last time is excessively long, and a time interval between the first data packet received by the RLC and the data packet received last time is less than the second preset threshold, the RLC entity determines that the first SN jumps abnormally. In other words, if a large SN interval occurs in a short time, the RLC entity determines that the SN jumps abnormally.

In embodiments of this application, the second preset threshold may be ThrdTimeIntv, which is defined as a jump time interval threshold, and is generally used with the ThrdSnIntv (that is, the first preset threshold).

In embodiments of this application, a current moment may be T (Cur), and a moment at which a data packet corresponding to a largest SN is received before the current moment may be T (H).

The step may be understood as follows: If CurSn−Vur (H)>ThrdSnIntv and T (H)−T (Cur)<ThrdTimeIntv, the RLC entity determines that the data packet received this time jumps abnormally, or the SN received this time jumps abnormally.

3. If a third difference between the first SN and the third SN is less than a third preset threshold, and the target variable is greater than 0, the RLC entity determines that the first SN jumps abnormally, and updates the target variable to 0.

The third SN in embodiments of this application is an SN corresponding to any data packet received before the current moment other than the temporary buffer. Further, the third SN may alternatively be a largest SN corresponding to a data packet received before the current moment other than the temporary buffer.

The target variable is related to the SN of the data packet received before the current moment. In other words, an initial value of the target variable is 0, and the target variable may change according to the SN in data packets received before. A change rule is mainly as follows: If the third difference is greater than the third preset threshold, the RLC entity temporarily buffers the first data packet (that is, does not push the RLC window, and does not update Vur(H)), and increases the target variable by 1. If the third difference is less than the third preset threshold and the target variable is 0, the RLC entity sends the first data packet to a PDCP entity in the network device. If a third difference between the first SN and the third SN is less than a third preset threshold, and the target variable is greater than 0, the RLC entity determines that the first SN jumps abnormally, and updates the target variable to 0.

For example, the third preset threshold is 10, and a sequence of the SN corresponding to the data packet received by the RLC entity is 1, 2, 3, 200, 4, and 5. When the RLC entity starts to receive a data packet whose SN is 1, SN is 2, and SN is 3, it is normal and the target variable is 0 and remains unchanged. After receiving a data packet whose SN is 3, the RLC entity receives a data packet whose SN is 200, and the third difference is 197, which is greater than 10 (that is, the third preset threshold). In this case, the RLC entity temporarily buffers the data packet whose SN is 200, and increases the target variable by 1, that is, the target variable is 1 in this case. After receiving the data packet whose SN is 200, the RLC entity receives a data packet whose SN is 4. Because the temporary buffer does not update Vur (H), Vur (H) in this case is 3. Therefore, the third difference is 1, which is less than the third preset threshold. In addition, if the target variable in this case is 1, and is greater than 0, the RLC entity determines that the SN is abnormal, and updates the target variable to 0, which does not affect subsequent transmission. After receiving the data packet whose SN is 4, the RLC entity receives a data packet whose SN is 5. The third difference is 1, and is less than the third preset threshold. The target variable in this case is 0, and the RLC entity normally receives and sends the data packet whose SN is 5.

In embodiments of this application, the second preset threshold may be the same as or different from the third preset threshold. This is not limited herein.

In embodiments of this application, the target variable may be ExptSnNum, and is initialized to 0. The temporary buffer may be ExptSnBuff, and is initially empty. A data packet in the temporary buffer does not update Vur (H).

Certainly, if a sequence of the SN corresponding to the data packet received by the RLC entity is 1, 2, 3, 200, 201, 202, . . . , and 4, too many packets are jumped in the intermediate SN. That is, there are too many temporarily buffered data packets (the target variable is too large), and the RLC window cannot move. To resolve the problem, a target threshold may be introduced. When the target variable is greater than the target threshold, the RLC entity transmits all temporarily buffered data packets to the RLC window for normal processing (that is, sends the temporarily buffered data packets to the PDCP entity), updates the RLC window, and updates the target variable to 0.

The target threshold in embodiments of this application may be ThrdExptSnNum. The foregoing process may also be understood as follows: If ExptSnNum>ThrdExptSnNum, the buffered packet in ExptSnBuff is pushed to the RLC window for subsequent normal processing.

In embodiments of this application, greater than may be greater than or equal to, and less than may be less than or equal to. That is, greater than or equal to corresponds to less than, and greater than corresponds to less than or equal to. Whether an equal sign is on a greater than side or a less than side is not specifically limited herein.

In embodiments of this application, there are many manners in which the RLC entity determines, based on the first SN and the second SN, whether the first SN jumps abnormally. The foregoing three manners are only examples for description. There is another manner in actual application, and this is not limited herein.

303. If the first SN jumps abnormally, the RLC entity sends the first abnormality information to the PDCP entity. This step is optional.

After determining that the first SN jumps abnormally, the RLC entity may send the first abnormality information to the PDCP entity, where the first abnormality information is used to notify the PDCP entity that the SN jumps abnormally.

304. The PDCP determines whether a one-way audio event occurs. This step is optional.

In embodiments of this application, a trigger condition for determining, by the PDCP, whether a one-way audio event occurs may be: after receiving the first abnormality information sent by the RLC entity, or may be a timer (that is, determining whether a one-way audio event occurs in a specific time), or may be always determining. This is not specifically limited herein.

If a fourth difference between the current moment and a corresponding previous moment at which a data packet sent by the RLC entity in the network device is received is greater than a fourth preset threshold, the PDCP entity in the network device determines that a one-way audio event occurs, or the PDCP entity determines that a one-way audio event is caused by an SN abnormal jump.

The fourth preset threshold in embodiments of this application may be ThrdTimeUniDir, and a corresponding previous moment at which a data packet sent by the RLC entity in the network device is received may be T (LastRlc). The step may be understood as follows: If T (Cur)−T (LastRlc)>ThrdTimeUniDir, the PDCP entity determines that the one-way audio event occurs, or the PDCP entity determines that the one-way audio event is caused by the SN abnormal jump. If T (Cur)−T (LastRlc)<ThrdTimeUniDir, the PDCP entity determines that a one-way audio event does not occur. That is, if a time interval between a data packet received this time and a data packet received last time is greater than ThrdTimeUniDir, it is determined that the one-way audio event occurs.

305. If a one-way audio event occurs, the PDCP entity determines whether the one-way audio event is caused by an SN abnormal jump. This step is optional.

If a fifth difference between the current moment and a corresponding previous moment at which an SN abnormal jump sent by the RLC entity is received is less than a fifth preset threshold, the PDCP entity determines that a one-way audio event is caused by the SN abnormal jump. If a fifth difference between the current moment and a corresponding previous moment at which an SN abnormal jump sent by the RLC entity is received is greater than a fifth preset threshold, the PDCP entity determines that the one-way audio event is not caused by the SN abnormal jump.

The fifth preset threshold in embodiments of this application may be ThrdTimeProtect, and a corresponding previous moment at which an SN abnormal jump sent by the RLC entity is received is T (SnExpt). The step may be understood as follows: If T (Cur)−T (SnExpt)<ThrdTimeProtect, the PDCP entity determines that the one-way audio event is caused by the SN abnormal jump. If T (Cur)−T (SnExpt)>ThrdTimeProtect, the PDCP entity determines that the one-way audio event is not caused by the SN abnormal jump.

Optionally, to determine whether the one-way audio event is caused by the SN abnormal jump this time, the fifth preset threshold may be further set to be greater than the fourth preset threshold, or greater than a fourth threshold plus duration of an RLC reordering timer. That is, if the one-way audio event is not detected after T (Cur)−T (SnExpt)>ThrdTimeProtect, determining is stopped. In other words, if the fifth difference is greater than ThrdTimeProtect, it indicates that a cause of the one-way audio event may be unrelated to the SN abnormal jump.

306. The PDCP entity sends a third abnormality event to the RRC entity. This step is optional.

A PDCP entity sends third abnormality information to an RRC entity, where the third abnormality information indicates the RRC entity to trigger a terminal device to perform intra-cell handover or inter-cell handover, and the data packet is a data packet of the terminal device that is forwarded by the RLC entity to the PDCP entity.

After determining that the one-way audio event is caused by the SN abnormal jump, the PDCP entity may send a third abnormality event to the RRC entity. Alternatively, after determining that the one-way audio event occurs, the PDCP entity may send third abnormality information to the RRC entity, which is not specifically limited herein.

307. The RLC entity sends a second abnormality event to the RRC entity. This step is optional.

After determining that the first SN jumps abnormally, the RLC entity may send abnormality information (that is, the first abnormality information) to a PDCP layer, or may directly send abnormality information (that is, the second abnormality information) to the RRC entity. This is not limited herein.

The RLC entity sends second abnormality information to an RRC entity in the network device, where the second abnormality information indicates the RRC entity to perform intra-cell handover or inter-cell handover of the terminal device.

308. The RRC entity triggers intra-cell handover of the terminal device. This step is optional.

A condition that the RRC entity triggers the intra-cell handover of the terminal device may be receiving the second abnormality information sent by the RLC entity (that is, if the SN jumps abnormally, the intra-cell handover is performed), or may be receiving the third abnormality information sent by the PDCP entity (that is, if the one-way audio event caused by the SN abnormal jump occurs, the intra-cell handover is performed). This is not specifically limited herein.

After receiving abnormality information (the second abnormality information or the third abnormality information), the RRC entity triggers the terminal device to perform the intra-cell handover. After the handover is performed, a bearer with QCI being 1 at which a voice service of the user is located is reset, and a window of RLC is recovered to an initial state. In this way, a window disturbed by abnormal packets at the RLC layer may continue to receive packets normally, and the voice service of the user is recovered from a one-way audio state.

In embodiments of this application, the second abnormality information or the third abnormality information may indicate the RRC entity to trigger the terminal device to perform intra-cell handover or inter-cell handover. The second abnormality information or the third abnormality information may also indicate that a one-way audio event occurs. Then, after learning that the one-way audio event occurs, the RRC entity triggers the terminal device to perform the intra-cell handover or the inter-cell handover.

Optionally, a resource of the terminal device may be released and reconnected. That is, a cell after the handover is performed may be a source cell, and/or a base station after the handover is performed may be a source base station.

Optionally, after receiving abnormality information (the second abnormality information or the third abnormality information), the RRC entity triggers the terminal device to perform the inter-cell handover. That is, a cell after the handover is performed may not be a source cell, and/or a base station after the handover is performed may not be a source base station.

An implementation of embodiments of this application may include step 301 and step 302. Another implementation of embodiments of this application may include step 301, step 302, step 303, step 304, step 306, and step 308. Another implementation of embodiments of this application may include step 301, step 302, step 303, step 304, step 305, step 306, and step 308. Another implementation of embodiments of this application may include step 301, step 302, step 307, and step 308. In embodiments of this application, there are a plurality of cases of the steps, and cases of the steps may be combined.

Embodiments of this application propose to determine an SN jump at the RLC layer, occurrence of a one-way audio event is predicted in advance, and then the one-way audio event is associated with a one-way audio event that occurs at a PDCP layer after the one-way audio event. If it is considered that the one-way audio event occurs currently is caused by the SN jump at the RLC layer, the intra-cell handover performed by the user is triggered once. After the handover is performed, a bearer with QCI being 1 at which a voice service of the user is located is reset, and a window of RLC is recovered to an initial state. In this way, a window disturbed by abnormal packets at the RLC layer may continue to receive packets normally, and the voice service of the user is recovered from a one-way audio state. Intra-cell handover is used to recover a one-way audio event caused by the SN abnormal jump at the RLC layer. In addition, the RLC layer may identify an SN abnormal jump, and perform a subsequent operation such as handover, to reduce occurrence of a one-way audio event.

Corresponding to the methods provided in the foregoing method embodiments, an embodiment of this application further provides a corresponding apparatus. The apparatus includes a corresponding module configured to perform the foregoing embodiments. The module may be software, hardware, or a combination of software and hardware.

Figures 4, 5:
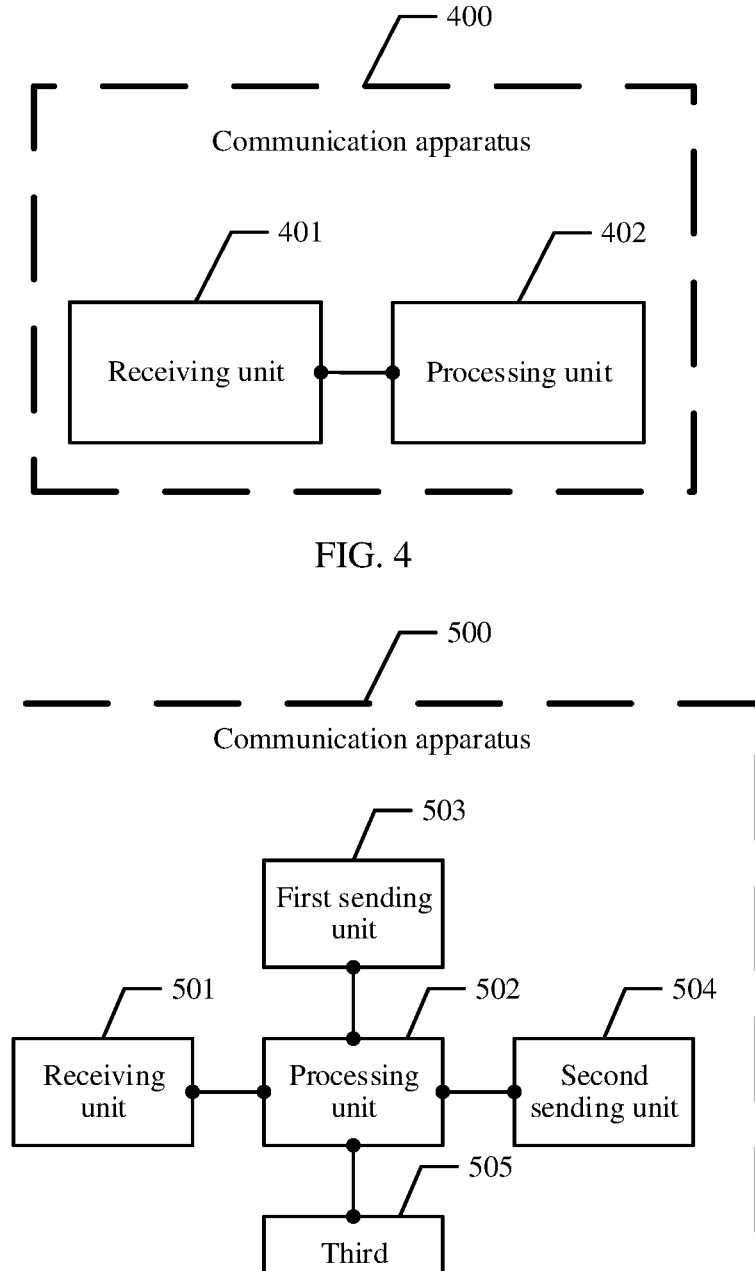
FIG. 4 to FIG. 10 are several schematic structural diagrams of a communication apparatus according to an embodiment of this application.

FIG. 4 shows an embodiment of a communication apparatus according to an embodiment of this application. The communication apparatus may be an RLC entity. Alternatively, the communication apparatus may be a component (for example, a processor, a chip, or a chip system) of an RLC entity, and the communication apparatus includes:

a receiving unit 401, configured to receive a first data packet corresponding to a first sequence number SN from a terminal device; and a processing unit 402, configured to determine, based on the first SN and a second SN, whether the first SN jumps abnormally, where the second SN is an SN of any data packet received before a current moment.

In this embodiment, operations performed by units in the communication apparatus are similar to those described in the embodiments shown in FIG. 1 to FIG. 3, and details are not described herein.

In this embodiment, the processing unit 402 may determine whether an SN jumps abnormally, to perform a subsequent operation such as handover, thereby reducing occurrence of a one-way audio event.

FIG. 5 shows another embodiment of a communication apparatus according to an embodiment of this application. The communication apparatus may be an RLC entity. Alternatively, the communication apparatus may be a component (for example, a processor, a chip, or a chip system) of an RLC entity, and the communication apparatus includes:

a receiving unit 501, configured to receive a first data packet corresponding to a first sequence number SN from a terminal device; and a processing unit 502, configured to determine, based on the first SN and a second SN, whether the first SN jumps abnormally, where the second SN is an SN of any data packet received before a current moment.

The communication apparatus in this embodiment further includes:

a first sending unit 503, configured to send, the first data packet to a PDCP entity in the network device if the third difference is less than the third preset threshold and the target variable is 0;

a second sending unit 504, configured to send first abnormality information to a PDCP entity in the network device, so that the PDCP entity indicates an RRC entity to perform intra-cell handover of the terminal device, where the first abnormality information indicates that the SN jumps abnormally;

a third sending unit 505, configured to send second abnormality information to an RRC entity in the network device, where the second abnormality information indicates the RRC entity to perform intra-cell handover of the terminal device; and a processing unit 502, specifically configured to determine, if a first difference between the first SN and the second SN is greater than a first preset threshold, that the first SN jumps abnormally.

The processing unit 502 is specifically configured to determine, if the first difference is greater than the first preset threshold, and a second difference between a first moment and the current moment is less than a second preset threshold, that the first SN jumps abnormally, where the first moment is a moment at which a data packet corresponding to the second SN is received before the current moment.

The processing unit 502 is specifically configured to: determine, if a third difference between the first SN and a third SN is less than a third preset threshold, and a target variable is greater than 0, that the first SN jumps abnormally, and update the target variable to 0, where the third SN is an SN corresponding to any data packet received before the current moment other than a temporary buffer, and the target variable is related to an SN of a data packet received before the current moment.

The processing unit 502 is further configured to: temporarily buffer the first data packet if the third difference is greater than the third preset threshold, and increase the target variable by 1, where the third SN is the SN corresponding to any data packet received before the current moment other than the temporary buffer, and the target variable is related to the SN of the data packet received before the current moment.

Optionally, the second SN is a largest SN in data packets received before the current moment.

Optionally, the third SN is a largest SN in the data packet received before the current moment other than the temporary buffer.

In this embodiment, operations performed by units in the communication apparatus are similar to those described in the embodiments shown in FIG. 1 to FIG. 3, and details are not described herein.

In this embodiment, the processing unit 502 determines the SN jump at the RLC layer, and then associates the SN jump with a one-way audio event that occurs at the PDCP layer after the SN jump. If it is considered that the one-way audio event occurs currently is caused by the SN jump at the RLC layer, the intra-cell handover performed by the user is triggered once. After the handover is performed, a bearer with QCI being 1 at which a voice service of the user is located is reset, and a window of RLC is recovered to an initial state. In this way, a window disturbed by abnormal packets at the RLC layer may continue to receive packets normally, and the voice service of the user is recovered from a one-way audio state. On one hand, the intra-cell handover is used to recover a one-way audio event caused by the SN abnormal jump. On the other hand, the communication apparatus may identify the SN abnormal jump, and perform a subsequent operation such as handover, to reduce occurrence of a one-way audio event.

Figures 6, 7:
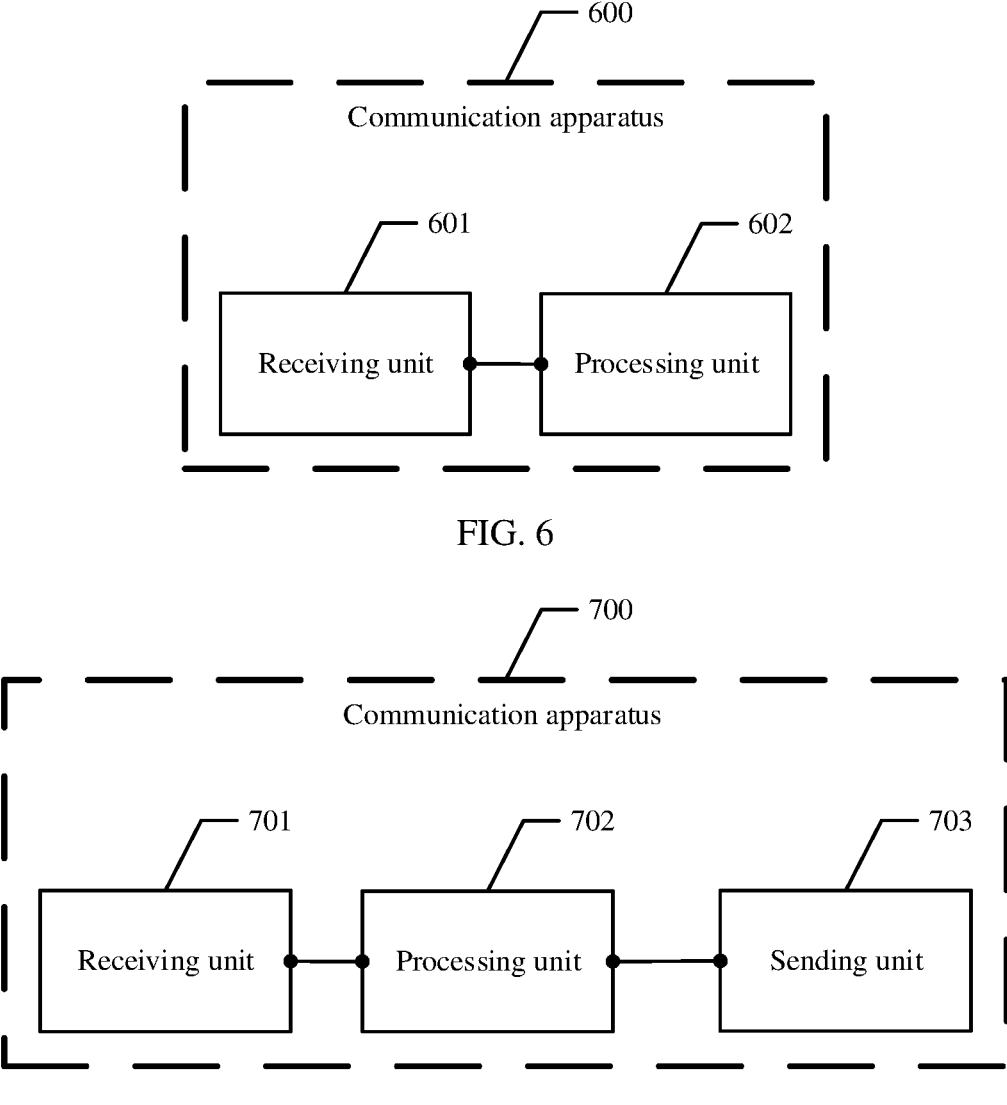

FIG. 6 shows another embodiment of a communication apparatus according to an embodiment of this application. The communication apparatus may be a PDCP entity, or may be a component (for example, a processor, a chip, or a chip system) of a PDCP entity. The communication apparatus includes:

a receiving unit 601, configured to receive first abnormality information sent by an RLC entity, where the first abnormality information indicates that an SN jumps abnormally; and a processing unit 602, configured to determine, if a fourth difference between a current moment and a corresponding previous moment at which a data packet sent by the RLC entity in the network device is received is greater than a fourth preset threshold, and a fifth difference between the current moment and a corresponding previous moment at which an SN abnormal jump sent by the RLC entity is received is less than a fifth preset threshold, that a one-way audio event is caused by the SN abnormal jump.

In this embodiment, operations performed by units in the communication apparatus are similar to those described in the embodiments shown in FIG. 1 to FIG. 3, and details are not described herein.

In this embodiment, the processing unit 602 may associate the SN abnormal jump with the one-way audio event, so that the intra-cell handover of the terminal device may be subsequently triggered in time, and the one-way audio event or a voice service is quickly recovered.

FIG. 7 shows another embodiment of a communication apparatus according to an embodiment of this application. The communication apparatus may be a PDCP entity, or may be a component (for example, a processor, a chip, or a chip system) of a PDCP entity. The communication apparatus includes:

a receiving unit 701, configured to receive first abnormality information sent by an RLC entity, where the first abnormality information indicates that an SN jumps abnormally; and a processing unit 702, configured to determine, if a fourth difference between a current moment and a corresponding previous moment at which a data packet sent by the RLC entity in the network device is received is greater than a fourth preset threshold, and a fifth difference between the current moment and a corresponding previous moment at which an SN abnormal jump sent by the RLC entity is received is less than a fifth preset threshold, that a one-way audio event is caused by the SN abnormal jump.

The communication apparatus in this embodiment further includes:

a sending unit 703, configured to send third abnormality information to an RRC entity, where the third abnormality information indicates the RRC entity to trigger a terminal device to perform intra-cell handover, and the data packet is a data packet of the terminal device that is forwarded by the RLC entity to the communication apparatus.

In this embodiment, operations performed by units in the communication apparatus are similar to those described in the embodiments shown in FIG. 1 to FIG. 3, and details are not described herein.

In this embodiment, the processing unit 702 may determine, based on a value of the fourth difference and a value of the fourth preset threshold, whether a one-way audio event occurs, and determine whether the one-way audio event is caused by an SN abnormal jump. If the one-way audio event is caused by the SN abnormal jump, the sending unit 703 may send abnormality information to the RRC entity, so that the RRC entity may trigger intra-cell handover of the terminal device in time.

Figure 8:
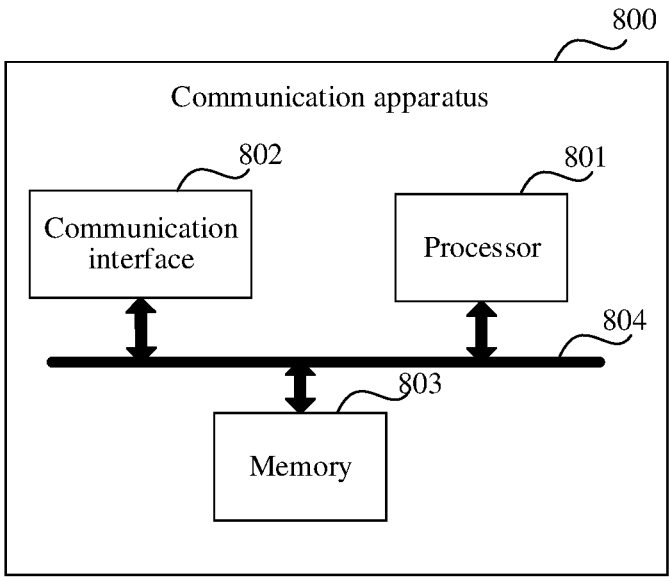

FIG. 8 is another possible schematic diagram of a communication apparatus 800 involved in the foregoing embodiments according to an embodiment of this application. The communication apparatus 800 may be specifically the RLC entity in the foregoing embodiments. The communication apparatus 800 may include but is not limited to a processor 801, a communication port 802, a memory 803, and a bus 804. In embodiments of this application, the processor 801 is configured to control and process an action of the communication apparatus 800.

In addition, the processor 801 may be a central processing unit, a general-purpose processor, a digital signal processor, an application-specific integrated circuit, a field programmable gate array, another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be noted that the communication apparatus shown in FIG. 8 may be specifically configured to implement functions of steps performed by the RLC entity in the method embodiments corresponding to FIG. 1 to FIG. 3, and implement technical effects corresponding to the RLC entity. For a specific implementation of the communication apparatus shown in FIG. 8, refer to descriptions in the method embodiments corresponding to FIG. 1 to FIG. 3. Details are not described herein.

Figure 9:
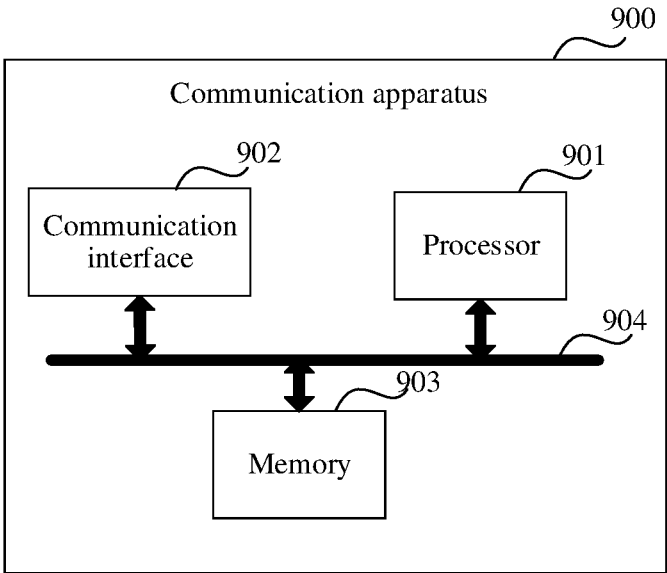

FIG. 9 is another possible schematic diagram of a communication apparatus 900 involved in the foregoing embodiments according to an embodiment of this application. The communication apparatus 900 may be specifically the PDCP entity in the foregoing embodiments. The communication apparatus 900 may include but is not limited to a processor 901, a communication port 902, a memory 903, and a bus 904. In embodiments of this application, the processor 901 is configured to control and process an action of the communication apparatus 900.

In addition, the processor 901 may be a central processing unit, a general-purpose processor, a digital signal processor, an application-specific integrated circuit, a field programmable gate array, another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be noted that the communication apparatus shown in FIG. 9 may be specifically configured to implement functions of steps performed by the PDCP entity in the method embodiments corresponding to FIG. 1 to FIG. 3, and implement technical effects corresponding to the PDCP entity. For a specific implementation of the communication apparatus shown in FIG. 9, refer to descriptions in the method embodiments corresponding to FIG. 1 to FIG. 3. Details are not described herein.

Figure 10:
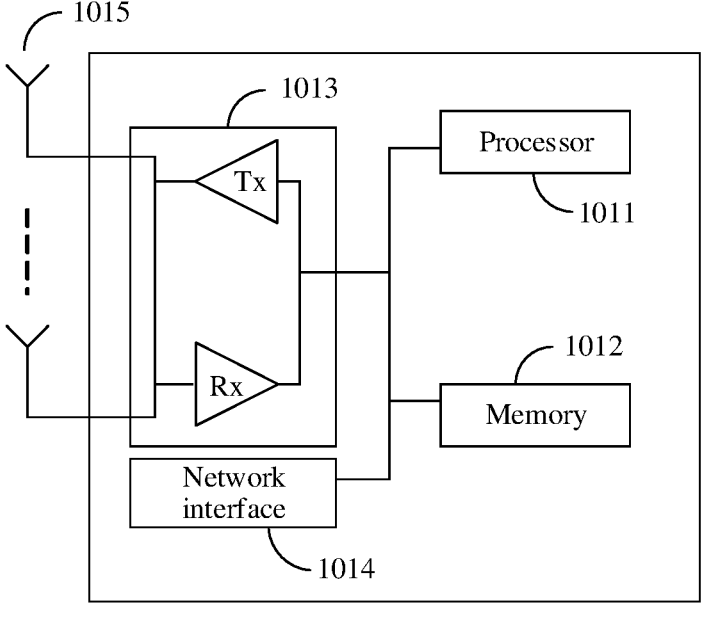

FIG. 10 is a schematic structural diagram of a communication apparatus in the foregoing embodiments according to an embodiment of this application. The communication apparatus may be specifically the network device (an RLC entity and a PDCP entity) in the foregoing embodiments. For a structure of the communication apparatus, refer to a structure shown in FIG. 10.

The communication apparatus includes at least one processor 1011, at least one memory 1012, at least one transceiver 1013, at least one network interface 1014, and one or more antennas 1015. The processor 1011, the memory 1012, and the transceiver 1013 are connected to the network interface 1014, for example, through a bus. In embodiments of this application, the connection may include various interfaces, transmission lines, buses, or the like, and this is not limited in this embodiment. The antenna 1015 is connected to the transceiver 1013. The network interface 1014 is configured to enable the communication apparatus to be connected to another communication device through a communication link. For example, the network interface 1014 may include a network interface, for example, an S1 interface, between the communication apparatus and a core network device. The network interface may include a network interface, for example, an X2 or Xn interface, between the communication apparatus and another network device (for example, another access network device or a core network device).

The processor 1011 is mainly configured to process a communication protocol and communication data, control the entire communication apparatus, execute a software program, and process data of the software program, for example, is configured to support the communication apparatus in performing actions described in the embodiments. The communication apparatus may include a baseband processor and a central processing unit. The baseband processor is mainly configured to process the communication protocol and the communication data. The central processing unit is mainly configured to: control an entire terminal device, execute the software program, and process the data of the software program. The processor 1011 in FIG. 10 may integrate functions of the baseband processor and the central processing unit. A person skilled in the art may understand that the baseband processor and the central processing unit each may be an independent processor, and are interconnected through a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. The function of processing the communication protocol and the communication data may be built in the processor, or may be stored in the memory in a form of a software program, and the processor executes the software program to implement a baseband processing function.

The memory is mainly configured to store the software program and data. The memory 1012 may exist independently, and is connected to the processor 1011. Optionally, the memory 1012 may be integrated with the processor 1011, for example, integrated into a chip. The memory 1012 may store program code for executing the technical solutions in embodiments of this application, and the processor 1011 controls execution of the program code. Various types of computer program code that are executed may also be considered as drivers of the processor 1011.

FIG. 10 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in embodiments of this application.

The transceiver 1013 may be configured to support receiving or sending of a radio frequency signal between the communication apparatus and a terminal, and the transceiver 1013 may be connected to the antenna 1015. The transceiver 1013 includes a transmitter Tx and a receiver Rx. Specifically, the one or more antennas 1015 may receive a radio frequency signal. The receiver Rx of the transceiver 1013 is configured to receive the radio frequency signal from the antenna, convert the radio frequency signal into a digital baseband signal or a digital intermediate frequency signal, and provide the digital baseband signal or the digital intermediate frequency signal for the processor 1011, so that the processor 1011 performs further processing on the digital baseband signal or the digital intermediate frequency signal, for example, performs demodulation processing and decoding processing. In addition, the transmitter Tx of the transceiver 1013 is further configured to receive a modulated digital baseband signal or digital intermediate frequency signal from the processor 1011, convert the modulated digital baseband signal or digital intermediate frequency signal into a radio frequency signal, and send the radio frequency signal through the one or more antennas 1015. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver may also be referred to as a transceiver unit, a transceiver, a transceiver apparatus, or the like. Optionally, a component that is configured to implement a receiving function and that is in the transceiver unit may be considered as a receiving unit, and a component that is configured to implement a sending function and that is in the transceiver unit may be considered as a sending unit. In other words, the transceiver unit includes the receiving unit and the sending unit. The receiving unit may also be referred to as a receiver, an input port, a receiving circuit, or the like. The sending unit may be referred to as a transmitter, a transmitting circuit, or the like.

It should be noted that the communication apparatus shown in FIG. 10 may be specifically configured to implement steps implemented by the network device (the RLC entity and the PDCP entity) in the method embodiment corresponding to FIG. 3, and implement technical effects corresponding to the network device. For a specific implementation of the communication apparatus shown in FIG. 10, refer to descriptions in the method embodiment in FIG. 3. Details are not described herein.

Embodiments of this application further provide a computer-readable storage medium storing one or more computer-executable instructions. When the computer-executable instruction is executed by a processor, the processor performs the method described in a possible implementation of the communication apparatus in the foregoing embodiments. The communication apparatus may be specifically the RLC entity or the PDCP entity in the method embodiment corresponding to FIG. 3.

Embodiments of this application further provide a computer program product storing one or more computer programs. When the computer program product is executed by the processor, the processor performs the method in a possible implementation of the communication apparatus. The communication apparatus may be specifically the RLC entity or the PDCP entity in the method embodiment corresponding to FIG. 3.

Embodiments of this application further provide a chip system. The chip system includes a processor, configured to support a data processing apparatus in implementing functions involved in the foregoing possible implementations of the communication apparatus. In a possible design, the chip system may further include a memory. The memory is configured to store program instructions and data that are necessary for the communication apparatus. The chip system may include a chip, or may include a chip and another discrete component. The communication apparatus may be specifically the RLC entity or the PDCP entity in the method embodiment corresponding to FIG. 3.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

What is claimed is:

1. A data processing method, comprising:
   receiving, by a radio link control (RLC) entity in a network device, a first data packet corresponding to a first sequence number (SN) from a terminal device; and
   determining, by the RLC entity based on the first SN and a second SN, whether the first SN jumps abnormally, wherein the second SN is an SN of any data packet received before a current moment,
   wherein the determining whether the first SN jumps abnormally comprises determining, by the RLC entity, that the first SN jumps abnormally, in response to
   a third difference between the first SN and a third SN being less than a third preset threshold, and
   a target variable being greater than 0, wherein
      the third SN is an SN corresponding to any data packet received before the current moment and other than a data packet or data packets in a temporary buffer, and
      the target variable is related to an SN of a data packet received before the current moment,
   the method further comprising:
      updating, by the RLC entity, the target variable to 0, in response to the determining that the first SN jumps abnormally.

2. The data processing method according to claim 1, wherein the determining whether the first SN jumps abnormally comprises:
   determining, by the RLC entity, that the first SN jumps abnormally, in response to a first difference between the first SN and the second SN being greater than a first preset threshold.

3. The data processing method according to claim 1, wherein the determining whether the first SN jumps abnormally comprises:
   determining, by the RLC entity, that the first SN jumps abnormally, in response to
   a first difference between the first SN and the second SN being greater than a first preset threshold, and
   a second difference between a first moment and the current moment being less than a second preset threshold, wherein the first moment is a moment at which a data packet corresponding to the second SN is received before the current moment.

4. The data processing method according to claim 1, further comprising:
   sending, by the RLC entity, the first data packet to a packet data convergence protocol (PDCP) entity in the network device in response to
   the third difference being less than the third preset threshold, and
   the target variable being 0.

5. The data processing method according to claim 1, further comprising:
   in response to the third difference being greater than the third preset threshold,
   temporarily buffering, by the RLC entity, the first data packet, and
   increasing, by the RLC entity, the target variable by 1.

6. The data processing method according to claim 1, wherein the second SN is a largest SN in data packets received before the current moment.

7. The data processing method according to claim 1, wherein the third SN is a largest SN in data packets received before the current moment and other than the data packet or data packets in the temporary buffer.

8. The data processing method according to claim 2, further comprising, in response to the determining, by the RLC entity, that the first SN jumps abnormally,
   sending, by the RLC entity, first abnormality information to a packet data convergence protocol (PDCP) entity in the network device, so that the PDCP entity indicates a radio resource control (RRC) entity in the network device to perform intra-cell handover of the terminal device, wherein the first abnormality information indicates that the first SN jumps abnormally.

9. The data processing method according to claim 2, further comprising, in response to the determining, by the RLC entity, that the first SN jumps abnormally,
   sending, by the RLC entity, second abnormality information to a radio resource control (RRC) entity in the network device, wherein the second abnormality information indicates the RRC entity to perform intra-cell handover of the terminal device.

10. A communication device, comprising:
    at least one processor; and
    one or more memories including computer instructions executable by the at least one processor to cause the at least one processor to perform operations comprising:
       receiving a first data packet corresponding to a first sequence number (SN) from a terminal device; and
       determining, based on the first SN and a second SN, whether the first SN jumps abnormally, wherein the second SN is an SN of any data packet received before a current moment,
    wherein the determining whether the first SN jumps abnormally comprises determining that the first SN jumps abnormally, in response to
    a first difference between the first SN and the second SN being greater than a first preset threshold, and
    a second difference between a first moment and the current moment being less than a second preset threshold, wherein the first moment is a moment at which a data packet corresponding to the second SN is received before the current moment.

11. The communication device according to claim 10, wherein the determining whether the first SN jumps abnormally comprises:
    determining that the first SN jumps abnormally, in response to a first difference between the first SN and the second SN being greater than a first preset threshold.

12. The communication device according to claim 10, wherein the determining whether the first SN jumps abnormally comprises:
    determining, that the first SN jumps abnormally, in response to
    a third difference between the first SN and a third SN being less than a third preset threshold, and
    a target variable being greater than 0, wherein
       the third SN is an SN corresponding to any data packet received before the current moment and other than a data packet or data packets in a temporary buffer, and
       the target variable is related to an SN of a data packet received before the current moment, the operations further comprising:

updating the target variable to 0, in response to the determining that the first SN jumps abnormally.

13. The communication device according to claim 12, wherein the operations further comprise:

sending the first data packet to a packet data convergence protocol (PDCP) entity in a network device in response to the third difference being less than the third preset threshold, and the target variable being 0.

14. The communication device according to claim 12, wherein the operations further comprise:

in response to the third difference being greater than the third preset threshold, temporarily buffering the first data packet, and increasing the target variable by 1.

15. The communication device according to claim 10, wherein the second SN is a largest SN in data packets received before the current moment.

16. The communication device according to claim 12, wherein the third SN is a largest SN in data packets received before the current moment and other than the data packet or data packets in the temporary buffer.

17. A communication device, comprising:

at least one processor; and one or more memories including computer instructions executable by the at least one processor to cause the at least one processor to perform operations comprising:

receiving first abnormality information sent by a radio link control (RLC) entity in a network device, wherein the first abnormality information indicates a sequence number (SN) abnormal jump of an SN; and determining that a one-way audio event is caused by the SN abnormal jump, in response to a fourth difference between a current moment and a corresponding previous moment at which a data packet sent by the RLC entity is received being greater than a fourth preset threshold, and a fifth difference between the current moment and a corresponding previous moment at which the SN abnormal jump indicated by the RLC entity is received being less than a fifth preset threshold, wherein the fifth preset threshold is greater than the fourth preset threshold.

18. The communication device according to claim 17, wherein the operations further comprise:

sending third abnormality information to a radio resource control (RRC) entity in the network device, wherein the third abnormality information indicates the RRC entity to trigger a terminal device to perform intra-cell handover, and the data packet is a data packet of the terminal device that is forwarded by the RLC entity to the communication device.

* * * * *